United States Patent [19]
Dimos et al.

[11] Patent Number: 5,268,927
[45] Date of Patent: Dec. 7, 1993

[54] DIGITAL ADAPTIVE TRANSVERSAL FILTER FOR SPREAD SPECTRUM RECEIVERS

[75] Inventors: George Dimos, Cambridge; Triveni N. Upadhyay, Burlington, both of Mass.

[73] Assignee: Mayflower Communications Company, Inc., Reading, Mass.

[21] Appl. No.: 957,281

[22] Filed: Oct. 6, 1992

[51] Int. Cl.[5] .............................. H04L 27/30
[52] U.S. Cl. ........................ 375/1; 364/724.16; 364/724.19
[58] Field of Search ............. 375/1, 14; 380/34; 364/724.16, 724.19; 358/166

[56] References Cited

U.S. PATENT DOCUMENTS

| | | | |
|---|---|---|---|
| 4,271,525 | 6/1981 | Watanabe | 375/14 |
| 4,591,669 | 5/1986 | Duttweiler et al. | 364/724.16 |
| 5,043,814 | 8/1991 | Lish | 358/166 |
| 5,050,119 | 9/1991 | Lish | 364/724.16 |
| 5,132,985 | 7/1992 | Hashimoto et al. | 375/1 |
| 5,181,225 | 1/1993 | Neeser et al. | 375/1 |
| 5,185,762 | 2/1993 | Schilling | 375/1 |

Primary Examiner—Salvatore Cangialosi
Attorney, Agent, or Firm—Robert F. O'Connell

[57] ABSTRACT

A digital adaptive transversal filter includes an interface circuit for regulating and digitizing analog input signals, which comprise of multiple spread-spectrum signals, additive thermal noise and additive multiple narrowband interferers, to provide multi-bit digital input signals. A digital finite impulse response filter having a set of variable digital weight coefficients responds to the multi-bit digital input signals to generate digital output signals which contain a reduced amount of narrowband interference. A digital weight generator responds to the digital input and digital output signals for updating the digital weight coefficients, and a reset generator periodically resets the digital weight coefficients to zero initial values.

In a preferred embodiment an 8-tap, 8-bit digital adaptive transversal filter operating at 22 MHz was implemented with discrete components and a processing gain of 30 dB was demonstrated.

6 Claims, 5 Drawing Sheets

DIGITAL ADAPTIVE TRANSVERSAL FILTER FOR SPREAD SPECTRUM RECEIVERS

INTRODUCTION

This invention relates generally to radio receiving apparatus for processing spread spectrum signals contaminated by interference and, more particularly, to spread spectrum receivers using digital adaptive transversal filters for such purpose.

BACKGROUND OF THE INVENTION

Spread spectrum signals are used in digital radio systems for telecommunication and navigation purposes. In particular, in a Global Positioning System (GPS), which is a well known spread spectrum system, a receiver processes several spread spectrum signals, each one emitted by a different satellite, to track the distance of the receiver from each satellite and, thereby, to determine its own position. In telecommunication systems, spread spectrum signals are used for (i) combatting interference, (ii) transmitting at very low power to avoid detection/interception, and (iii) multiplexing one channel over many users.

The basic operations of spread spectrum processing are (a) signal spreading, that is, bandwidth expansion of the transmitted signal by a large factor (typically higher than 100) through pseudorandom noise modulation, and (b) signal despreading, that is, bandwidth compression of the received signal by the same factor, which is often referred to as the "processing gain". These operations spread the power of any incident interference over the whole system bandwidth, so that, after signal despreading, the effective interference power is suppressed by a factor equal to the processing gain. Bandwidth expansion in spread spectrum systems is implemented by two methods. In direct sequence/spread spectrum (DS/SS) systems, for example, each data bit is mapped into a pseudorandom noise (PN) sequence of binary pulses (chip pulses). In frequency hopped/spread spectrum (FH/SS) systems, each data bit, or data bit fraction, is modulated by a different carrier so that the record of used carrier frequencies constitutes a PN sequence. In both methods, signal despreading is accomplished by correlating the received signal with the known PN chip or carrier frequency sequence.

In a DS/SS receiver it is possible to suppress a narrowband interferer beyond the processing gain, by filtering the received signal prior to despreading through an adaptive transversal filter (ATF). An ATF estimates the interference component in a reference input sample $X_i$ through an optimal linear combination $\hat{X}_i = W_N X_{i-N} + \ldots + W_1 X_{i-1} + W_{-1} X_{i+1} + \ldots + W_{-M} X_{i+M}$ of N past samples $X_{i-1} \ldots, X_{i-N}$ and M future samples $X_{i+1}, \ldots, X_{i+M}$, which are typically spaced one-chip interval apart. Interference is suppressed by subtracting the estimate $\hat{X}_i$ from the reference $X_i$ and the difference $Y_i$ is the ATF output, i.e., $Y_i = X_i - \hat{X}_i$. If the interference is estimated from past samples only (i.e., as in prediction filtering), the ATF is referred to as a one-sided ATF. If future samples, as well as past samples, are used (i.e., as in interpolation filtering) then the ATF is referred to as a two-sided ATF.

Besides suppressing interference, the above filtering increases the thermal noise and distorts the PN-code in ATF output Y. The excess thermal noise is due to combining the thermal noise in $X_i$ together with N+M (statistically independent) noise components in the samples $X_{i-k}$. The PN-code distortion is due to combining the PN-code in $X_i$ together with N+M versions of the PN-code which are time-shifted by k chips, k= −M to N, from the reference. PN-code distortion results in interchip interference in telecommunication systems, and in code-phase bias in navigation systems. The ATF gain corresponds to the net benefit of interference suppression minus the signal-to-noise (SNR) losses due to excess thermal noise and PN-code distortion. The ATF gain increases as the PN-code components of the combined samples become less correlated and the interference components become more correlated. Since the correlation between consecutive signal samples increases as the signal power spectrum gets narrower, significant ATF gain is expected when the interference spectrum occupies a small fraction, typically less than 10%, of the PN-code bandwidth (i.e., system bandwidth). In the frequency domain, the operation of ATF corresponds to discriminating against the interference spectrum by forming a linear filter (through the appropriate weights $W_k$) with a notch around the center frequency of the interferer. Accordingly, ATF is not very effective against wideband interference, but it is very effective against continuous-wave (CW) interference and other narrowband interferences, such as pulsed CW and swept CW.

Assuming that the interference has an adequately narrowband spectrum for ATF application, there are two critical system requirements for achieving significant ATF gain. First, there must be adequate means for filtering and, secondly, there must be adequate means for generating automatically appropriate weights.

Regarding the filtering aspect thereof, the ATF must be capable of combining a minimum number of input samples to estimate the interference, which operation relates to the number of delay line taps used in the filter, each tap providing a signal to be weighted and added to the rest of the tap signals. If the interference forms K well-separated spectral bands, the minimum number of taps is 2K because the ATF needs to introduce at least one spectral notch at each interference band, at the expense of two taps (i.e., real weight coefficients) per notch. A disadvantage of increasing the number of taps is the resulting increase in system complexity. In this regard, a significant advantage of a symmetric two-sided ATF (in which M=N), compared to the one-sided ATF, is the symmetry of the optimal weights $W_i = W_{-i}$. Therefore, at least in steady-state, a 2N-tap ATF filter requires only N weight-updating circuits. It has been determined that for the same number of taps, a symmetric two-sided ATF yields the same gain as a one-sided ATF, but its optimal weights are much smaller (e.g., up to 50% smaller) resulting in decreased PN-code distortion. Therefore, the symmetric two-sided ATF is the preferred ATF architecture for DS/SS systems.

Regarding automatic weight generation, the optimal weights depend on the interference characteristics and on the criterion of optimality or cost function. An effective cost function for spread-spectrum systems subjected to strong interference is the average power of the ATF output signal Y. This is referred to as Mean Square Error (MSE) criterion, the error being equal to the ATF output. Classical MSE theory shows that the optimal weights can be obtained by solving a set of 2N linear equations (normal equations), which involve the correlation function of the ATF input signal. This is not a practical implementation approach due to the complexity of frequent updating of the input correlation estimates and solving the normal equations. Both of these complications can be avoided through an iterative solution of the normal equations. In this case, each weight is updated in every sampling interval, so that, after several updates, it tends to the MSE-optimal weight. A practical iterative algorithm, which has been shown to converge (on the average) to the optimal weights, is the Widrow-Hoff algorithm. This algorithm updates $W_k$ as: $NEW(W_k)=OLD(W_k)+uX_{i-k}Y_i$. The parameter u is referred to as the step-size (of the algorithm), and it controls the convergence characteristics and the steady-state weight jitter of the algorithm. As the step-size increases the adaptation converges faster, but the weights exhibit an increasing amount of jitter. If the step-size exceeds a certain threshold, depending on the largest eigenvalue of the normal equations, the weights grow in an erratic fashion, i.e., the algorithm does not converge. It has been determined, through ATF simulations in multiple CW interference, that the typical value of $u = 0.01$ is a good compromise between convergence rate and steady-state jitter.

Although the theoretical principles of adaptive transversal filtering were introduced almost 30 years ago, it is desirable to develop better filtering techniques so as to reduce the cost and improve the performance thereof, as well as to expand the use thereof into many new applications. Currently available ATF implementations have principally been using analog devices such as Charge Couple Devices (CCD) and Surface Acoustic Wave (SAW) devices. The size, power, weight and cost of analog ATF implementation has often precluded its consideration for many practical applications.

BRIEF SUMMARY OF THE INVENTION

The present invention addresses issues relating to size, power and low-cost digital ATF implementations operating at high sampling rates and under strong narrowband interference conditions, particularly for DS/SS applications. Digital implementation of the ATF is highly desirable for reducing the power, the size, and the cost of the device. High sampling rate requirements (e.g., over 10 MHz) are generally due to spread spectrum processing, since bandwidth expansion requires a transition from a low bit rate to a resulting much higher chip rate, and, specifically, to the P-Code rate (e.g., 10.23 MHz) of GPS, for which the invention has been reduced to practice. Moreover, strong interference conditions result from the normal reception of the desired signal at very weak power levels. In GPS, for example, the received satellite signals at $-130$ dBm are about 30 dB below the thermal noise; a 10 mW emitter located 100 miles away from the GPS receiver interferes at the same power as a satellite signal. The invention addresses high interference-to-noise ratio (J/N) requirements e.g., when they exceed 50 dB, for example.

Further, the invention provides innovative solutions to the following technical problems related to ATF implementations:
1. Analog-to-digital interface problems, wherein the invention produces sufficient power regulation to ensure that the derived digital signal at the ATF input does not suffer nonlinear distortions due to clipping or low input resolution.
2. Digital signal resolution problems, wherein the invention optimizes the effective resolution of the various digital signals internal to the ATF, and especially those related to the generation of the ATF weights.
3. Problems concerning the drifting of the ATF weight values, wherein the invention controls distortions in the weight-generation algorithm which cause long-term evolution of the weight values away from their optimal values.

Items (1) and (2) above refer mainly to the need for obtaining a higher ATF gain, whereas item (3) refers to the need to preserve a reliably functioning ATF. Drifting of the weights of digital ATF systems is a known phenomenon, in which the weights, after reaching their steady-state values, do not stay at those values but rather deviate in a consistent fashion. Although the mechanism of ATF weight drifting is not well understood, it can be demonstrated that the primary causes of drifting are (i) quantization and (ii) the preponderance of narrowband components over wideband components in the ATF input signal. For GPS-type signals, a system resolution of about 8 bits seems adequate to prevent weight drifting for J/N=20 dB, whereas a system resolution of 12 bits is required at J/N=50 dB. Therefore, the invention recognizes that the above problems (1), (2), (3) result from the primary requirement of developing a low cost digital implementation of ATF that operates well in high sampling rates and high J/N levels.

In summary, the invention has the following objectives:

It is an object of the invention to provide a simplified digital construction of an adaptive transversal filter (ATF) for direct sequence spread spectrum receivers.

It is another object of the invention to provide a digital ATF operating at sampling rates above 10 MHz.

It is another object of the invention to provide a digital ATF operating at interference-to-noise ratios exceeding 50 dB.

It is another object of the invention to provide a digital ATF with an improved analog-to-digital interface for increased interference suppression.

It is another object of the invention to provide a digital ATF with improved signal resolution for increased interference suppression.

It is another object of the invention to provide a digital ATF with control of the drifting phenomena associated with the automatic generation of the digital weights.

These and other features of the invention are embodied in an ATF having an analog-to-digital interface for regulating the power of the downconverted analog baseband signals and converting them to a digital baseband signal of variable resolution. The baseband signal contains multiple spread spectrum signals, thermal noise, and interference. The resolution of the digital baseband signal increases as the power of the interference increases.

The digital baseband signal is filtered at full resolution by a digital finite impulse response filter, employing previously computed digital filter weights, and generating a digital output signal in which the interference is suppressed by a variable factor. Interference suppression increases as the power of the received interference increases, and as its spectral concentration decreases.

The digital filter weights are generated in a recursive fashion at the full sampling rate, by updating the previous weights through the product of reduced resolution versions of the digital baseband signal and the digital output signal. Prevention of excessive drifting of the digital weights is accomplished by periodic resetting of the weights to zero initial values, and reinitialization of the weight adaptation process.

DESCRIPTION OF DRAWINGS

The invention can be described in more detail with the help of the accompanying drawings, wherein.

DESCRIPTION OF PREFERRED EMBODIMENT

Figure 1:
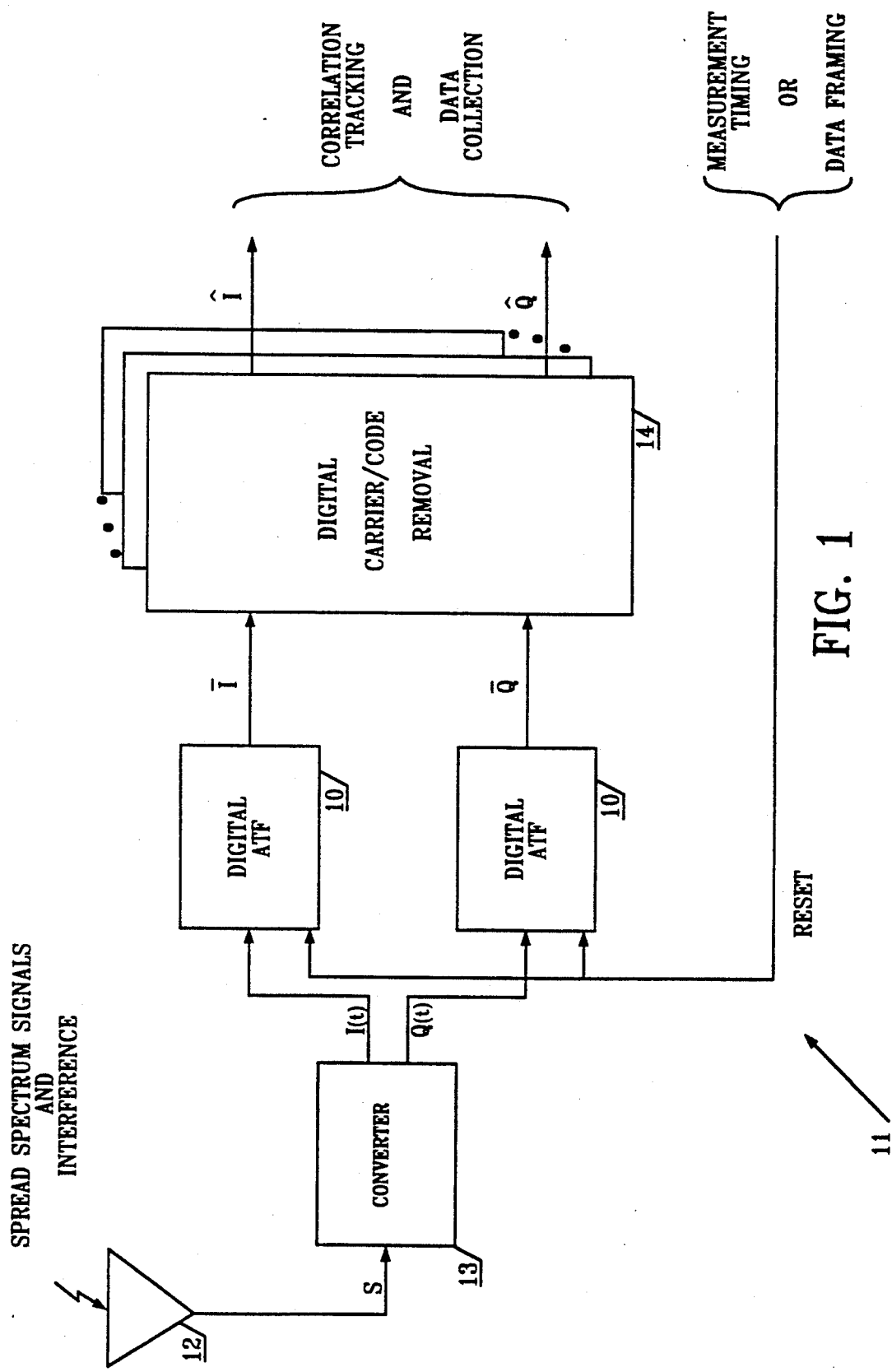
FIG. 1 is a block diagram showing a digital adaptive transversal filter (ATF) in a spread spectrum receiver, in accordance with a preferred embodiment of the invention.

FIG. 1 is a block diagram showing the use of digital adaptive transversal filters 10 (ATF) in a direct sequence/spread spectrum (DS/SS) receiver 11. The signal S received from an antenna 12 includes a number of pseudorandom Noise (PN) codes translated to some common RF carrier frequency, and can be referred to as PN-channels plus in-band interference. The converter 13 filters, amplifies, and shifts the signal from RF to baseband or some appropriate near-baseband carrier frequency. During such operation, thermal noise is added to the signal. In general, the last down-conversion stage of the circuit 13 involves quadrature mixing to derive an analog in-phase signal I(t) and an analog quadrature signal Q(t). These signals are sampled and quantized by well-known multi-bit analog-to-digital converters in the ATF circuit 10, to obtain the digital in-phase signal and the digital quadrature signal. Such circuitry is known to those in the art and need not be described in detail here.

Each converter output requires a separate digital ATF circuit 10. The two-ATF configurations of FIG. 1 may correspond to a telecommunication system with QPSK modulation or to a GPS system with sequential L1/L2 (1575/1228 MHZ) measurements. A BPSK DS/SS system requires a single ATF, while a GPS with simultaneous L1/L2 measurements requires four ATF's; two for the L1 I/Q and two for the L2 I/Q signals. Each ATF suppresses the interference in the received signal, so that it delivers a signal with a higher signal-to-noise (plus residual distortion) ratio (SNR) than the received SNR. It accomplishes this by effectively discriminating against the slower signal variations due to interference, or, in the frequency domain, against the spectral peaks of the interference rising above the wideband spectrum of the PN-code and thermal noise. In addition to the I/Q input signal, a RESET control signal (1-bit) is shown in FIG. 1, which is common to all the ATF's, and which is derived from well-known measurement epoch pulses available in a GPS receiver or from data framing pulses available in conventional telecommunication receivers. When an ATF filter 10 receives a RESET pulse, it starts adapting to the input signal characteristics from zero initial conditions.

The multi-bit ATF output signals $\bar{I}$ and $\bar{Q}$ are supplied to a plurality of carrier/code removal circuits 14. Each circuit section implements a matched filtering circuit for one of the received PN-channels. In telecommunication systems the carrier is usually removed completely at the converter, so that a circuit section 14 correlates the $\bar{I}$ and $\bar{Q}$ signals with the locally generated PN-code of a desired channel to obtain a sequence of $\hat{I}$ and $\hat{Q}$ signals of peak-correlation estimates averaged over the bit interval. These estimates may be used directly for data detection or they may be processed through additional stages of decoding equipment. In navigation systems, a circuit section 14 removes the near-baseband carrier and the channel Doppler frequency, as estimated by the carrier tracking, and it forms a number of in-phase correlations $\hat{I}$ and quadrature correlations $\hat{Q}$ of the $\bar{I}$ and $\bar{Q}$ input signals with the channel PN-code appropriately delayed. Assume that $<x(t) y(t-T)>$ denotes the correlation of the signal x and of the signal y delayed by T sec. In GPS, the I and Q correlations, referred to as measurements, are usually spaced Tc/2 apart (Tc denoting the chip interval) and they are used by the carrier/code tracking subsystem to update the estimates of the Doppler frequency and the delay between the received and the local PN code. For example, the in-phase prompt measurement $\hat{I}_P = <\bar{I}(t) PN(t)>$, the in-phase early measurement $\hat{I}_E = <\bar{I}(t) PN(t-Tc/2)>$, the in-phase late measurement $\hat{I}_L = <\bar{I}(t) PN(t+Tc/2)>$, and the corresponding group of quadrature measurements $\hat{Q}_P, \hat{Q}_E, \hat{Q}_L$ are used to estimate the carrier-phase error and the code-phase error. These errors are filtered in the tracking subsystem to update the carrier/code phase rates, which control the carrier/code removal, thereby closing the tracking loop. In both DS/SS applications, in telecommunication as well as in navigation systems, interference decreases the SNR of the post-correlation signals $\hat{I}$ and $\hat{Q}$, and thereby degrades system performance. The purpose of the ATF is not merely to suppress interference, but rather to restore the post correlation SNR as close as possible to its level under interference-free conditions.

Figure 2:
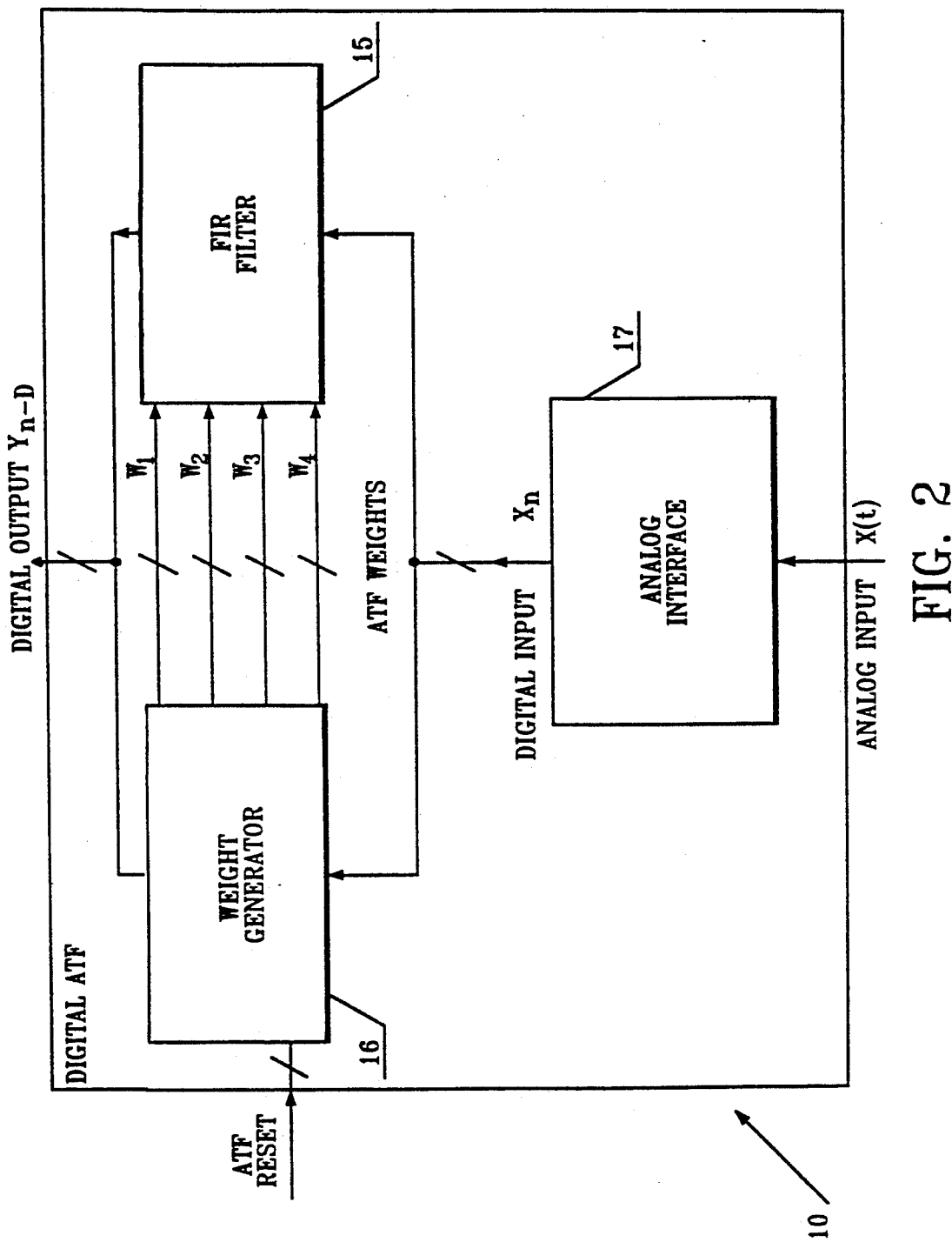
FIG. 2 is a block diagram of the architecture of the digital adaptive transversal filter of FIG. 1 along with its interface.

One preferred embodiment of the invention involves the design, implementation and testing of a two-sided, 8-tap, ATF operating at 22 MHz. A precorrelation gain of about 30 dB was demonstrated for isolated ATF operation. A post-correlation gain above 20 dB was demonstrated by inserting the ATF in a satellite spread-spectrum system (GPS) as shown in FIG. 1. A block diagram of the preferred ATF circuit embodiment is shown in FIG. 2.

As seen therein, the digital ATF 10 comprises two major digital sections, one, a digital finite impulse response (FIR) filter 15, and the other, a digital weight generator 16, as well as one analog interface section 17. Both digital sections are driven by the digital baseband input signal $X_n$. The FIR filter section 15 receives a set of four weights $W_1, W_2, W_3, W_4$ from the weight generator 16, and provides an ATF output signal $Y_{n-D}$ with a delay of D sampling cycles relative to the input. The weight generator 16 receives the feedback signal $Y_{n-D}$ from the FIR filter output, and provides the ATF weights which are updated at every sample. In addition, weight generator 16 receives periodically an ATF RESET pulse, which causes reinitialization of the ATF weights to near zero values. The performance of the digital ATF 10 depends critically on the resolution of the digital input signal. The analog interface circuit 17 receives an analog, unregulated signal from the last down-conversion stage of the converter 13, and provides a digital regulated signal of variable resolution to the ATF 10. The analog interface, the FIR filter, and the weight generator are driven by a common clock. Due to the high sampling rate of 22 MHz for a GPS P-code application, the digital ATF can be implemented with off-the-shelf discrete components or custom integrated circuits. At sampling rates of about 1 MHz, for example, for the GPS C/A code application, implementation through a general purpose digital signal processor becomes feasible.

Figure 3B:
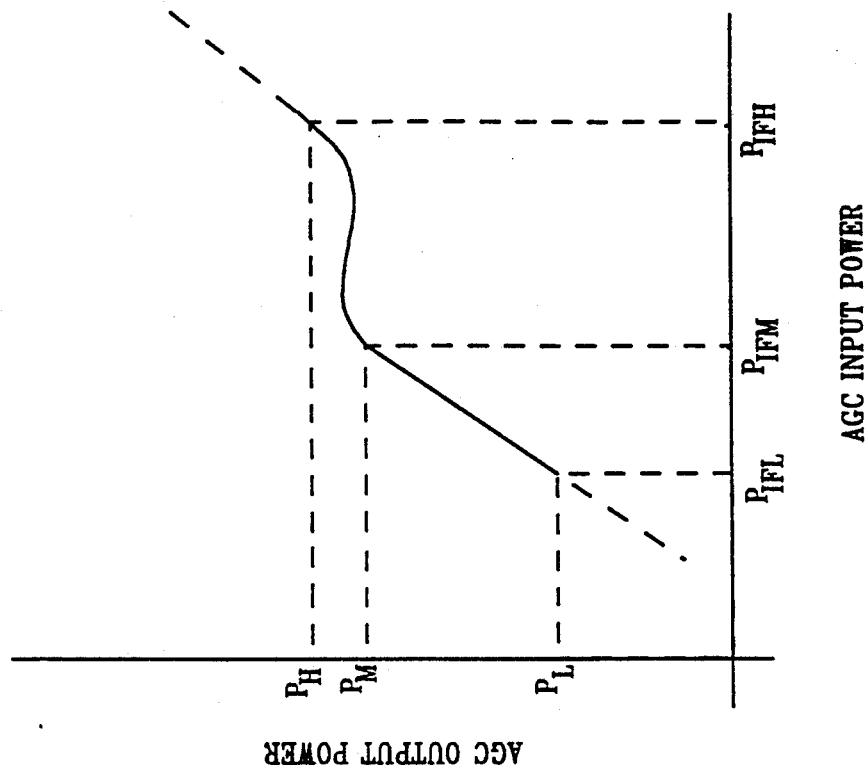
FIG. 3B is a graph illustrating power-regulation characteristics according to the preferred embodiment of the invention.
Figure 3A:
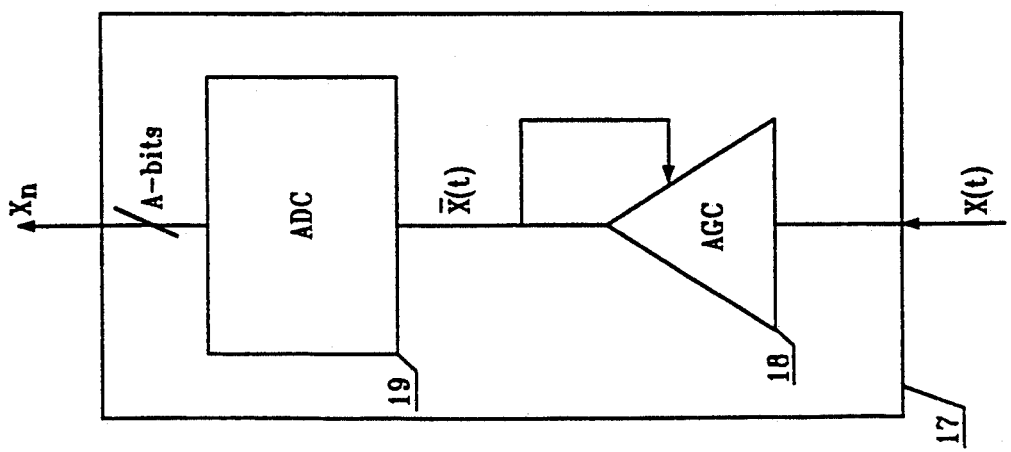
FIG. 3A is a block diagram of the analog interface of the ATF of FIG. 1.

The analog interface circuit 17 is shown in FIG. 3A. An analog signal X(t) from the last down-conversion stage of the converter 13 is supplied to an automatic gain control (AGC) circuit 18. X(t) contains multiple spread spectrum signals, interference, and thermal noise, which have been preamplified by some fixed gain in previous sections of the converter. The AGC circuit 18 provides a power-regulated analog signal $\overline{X}(t)$ to the analog-to-digital converter (ADC) 19, so that $\overline{X}(t)$ does not exceed the amplitude range of ADC when the interference is at its highest level, so that $\overline{X}(t)$ does not fall below the necessary amplitude level for reliable sign detection by ADC when there is no interference, and so that $\overline{X}(t)$ can be digitized with adequate resolution for ATF operation. The ADC circuit 19 samples $\overline{X}(t)$ at a selected sampling rate, which is typically equal to, or higher than, the chip rate, and provides a digital signal $X_n$ to ATF 10.

FIG. 3B shows a suitable power regulation characteristic for the AGC circuit 18. $P_{IFH}$, $P_{IFL}$ denote the maximum and minimum intermediate frequency (IF) power levels, respectively, at which the ATF is designed to operate The converter 13 must preamplify the RF input signal with minimum nonlinear distortion over the whole IF output power range, otherwise significant interference harmonics will enter the ATF and its performance will degrade. The ideal AGC characteristic, with respect to signal resolution, corresponds to a fully regulated (i.e., a constant-power) output signal over the whole IF power range. The requirement to operate under strong interference renders meeting the ideal AGC characteristic very costly. For example, in a prototype implementation the requirement of $P_{IFH}/P_{IFL} = 50$ dB resulted in an AGC with a control range of 50 dB and a bandwidth of 10 MHz. Satisfactory performance can be achieved with an AGC providing a partially regulated output signal, as shown in FIG. 3B. In a preferred design, the AGC 18 delivers a partially regulated signal at a power varying between a high level $P_H$ and an intermediate level $P_M$, as the IF input signal decreases in power from a maximum value $P_{IFH}$ to some intermediate value $P_{IFM}$. This is accomplished by varying the AGC gain from its maximum value at $P_{IFM}$ to its minimum value at $P_{IFH}$. Below $P_{IFM}$, the AGC gain stays constant at its maximum value, i.e., there is no power regulation. The power at the ADC output decreases at the same rate as the power at the AGC input.

The reason why partial-regulation of AGC is adequate for the ATF interface is that the input resolution requirements of the ATF decrease as the interference-to-noise ratio decreases. Since each bit of loss in ADC resolution corresponds to 6 dB of power decrease, a satisfactory AGC characteristic may exercise power control over only a segment of the RF power range. Besides signal resolution problems, the AGC design depends on the definition of the maximum and minimum power levels, $P_H$ and $P_L$ respectively. $P_H$ is defined from the reference input power of the ADC circuit 19 minus a back-off factor to avoid clipping of the signal peaks. $P_L$ is defined from the ADC requirement for reliable sign detection.

Figure 4:
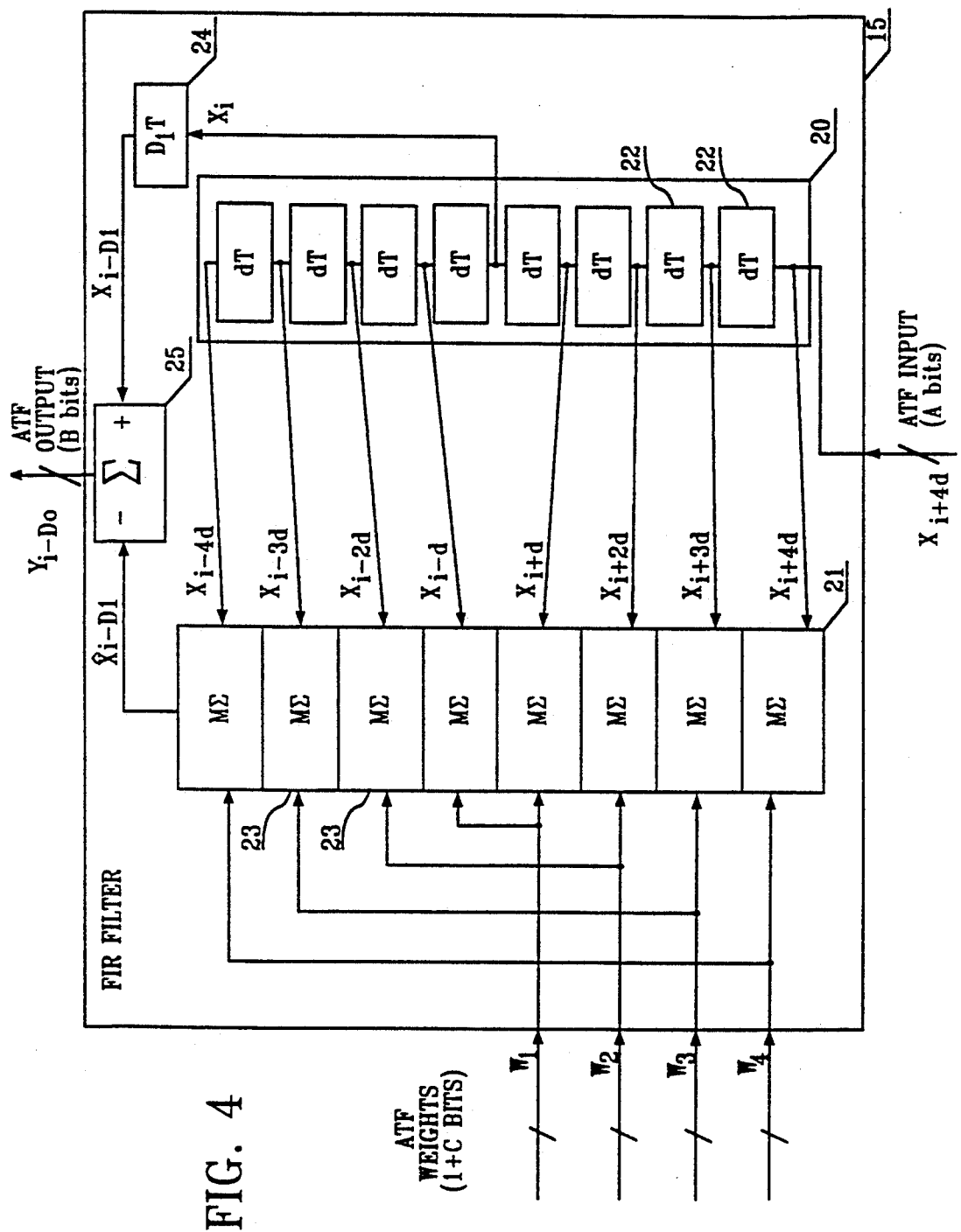
FIG. 4 is a block diagram of a digital finite impulse response filter section of the preferred embodiment of the invention shown in FIG. 1.

An implementation of the digital FIR filter 15, is shown in FIG. 4. A digital baseband input signal X enters a tapped delay line (TDL) 20 which in the embodiment shown has eight tapped delays 22, the center tap providing the present sample $X_i$, the first four side-taps providing the future samples $X_{i+d}$, $X_{i+2d}$, $X_{i+3d}$, $X_{i+4d}$, and the last four side-taps providing the past samples $X_{i-d}$, $X_{i-2d}$, $X_{i-3d}$, $X_{i-4d}$. The parameter "d" refers to the tap delay. In the implementation shown, adjacent TDL outputs are spaced two sampling intervals apart (i.e., d=2), which, for the intended GPS P-code receiver application, corresponds to 93% of the chip interval. In the case where the FIR filter resolution is different from the ADC resolution, a number of least-significant-bits (LSB's) are disabled either at the ADC (i.e., they are left disconnected) or at the FIR filter (i.e., there are fixed to a zero or one level reference). The effective input signal resolution of A bits is the lower resolution between the ADC output and the FIR filter input so that the TDL 20 need only be A bits wide. It has been determined in accordance with the invention that if the FIR filter has a higher resolution than the ADC, system performance improves significantly by setting the excess LSB's so that at a sign-reversal the FIR filter input takes the symmetric values $+2^{-(A+1)}$, $-2^{-(A+1)}$ rather than the asymmetric values $+0$, $-2^{-A}$.

For each input past/future sample, the FIR filter accepts a corresponding weight sample from the weight-generator 16. It is known that in symmetric two-sided ATF's the optimal, steady state weights for the input samples $X_{i-kd}$ and $X_{i+kd}$ are equal. It has now been further determined in accordance with the invention that ATF convergence is not affected significantly by enforcing the weight-symmetry condition during adaptation and, thereby, using a common weight $W_k$ for both $X_{i-kd}$ and $X_{i+kd}$. This approach decreases the required weight generator circuits by a factor of two. Regarding the weight-generator/FIR filter interface, the effective weight resolution of C bits is the lower resolution between the resolution of the weight-generator output and the FIR filter. To accommodate transient weight excursions above the reference unit weight, one extension bit is provided resulting in an (1+C)-bit FIR filter weight of maximum value 2.

The digital combiner 21 consists of 8 multiply/add stages 23. Each stage forms the product of an input sample $X_{i-kd}$ with the corresponding weight $W_k$, and it adds that product to the product of one of the adjacent stages to form a 2-stage sum. Adjacent 2-stage sums are added to form 4-stage sums, and, similarly, the two 4-stage sums are added to form the final sum of all of the products $W_k X_{i-kd}$; this is denoted by $\hat{X}_i$ in FIG. 4. The ATF output $Y_i = X_i - \hat{X}_i$ is obtained at the adder 25. The $D_1$-cycle delay 24 aligns the present sample $X_i$ with its estimate $\hat{X}_i$ derived by the FIR filter. It is therefore equal to the number of cycles from the instance the input samples $X_{i-4d}, \ldots, X_{i+4d}$ are valid, to the instance $\hat{X}_i$ is available. As described previously, the ATF output is the primary input to the carrier/code removal section 14. It is also a necessary feedback signal to the weight generator 16. The ATF output bit resolution of B bits is the resolution of the FIR filter output; lower resolution signals may be extracted from the ATF output for carrier/code removal and weight generation.

It has now been further determined in accordance with the invention, that it is not necessary for the ATF 10 and the carrier/code removal 14 to operate synchronously, i.e., to have the same clock. In particular, it has been demonstrated that, if the carrier/code removal uses 1-bit inputs, it may sample the sign-bit of the ATF-output Y at a variable rate depending on the requirements of the local numerically controlled oscillator for code removal, and independently of the 22 MHz clock rate of the ATF. The feasibility of asynchronous operation of the ATF and carrier/code removal is important because of the flexibility it provides for incorporating the digital ATF to an existing spread-spectrum receiver.

Figure 5:
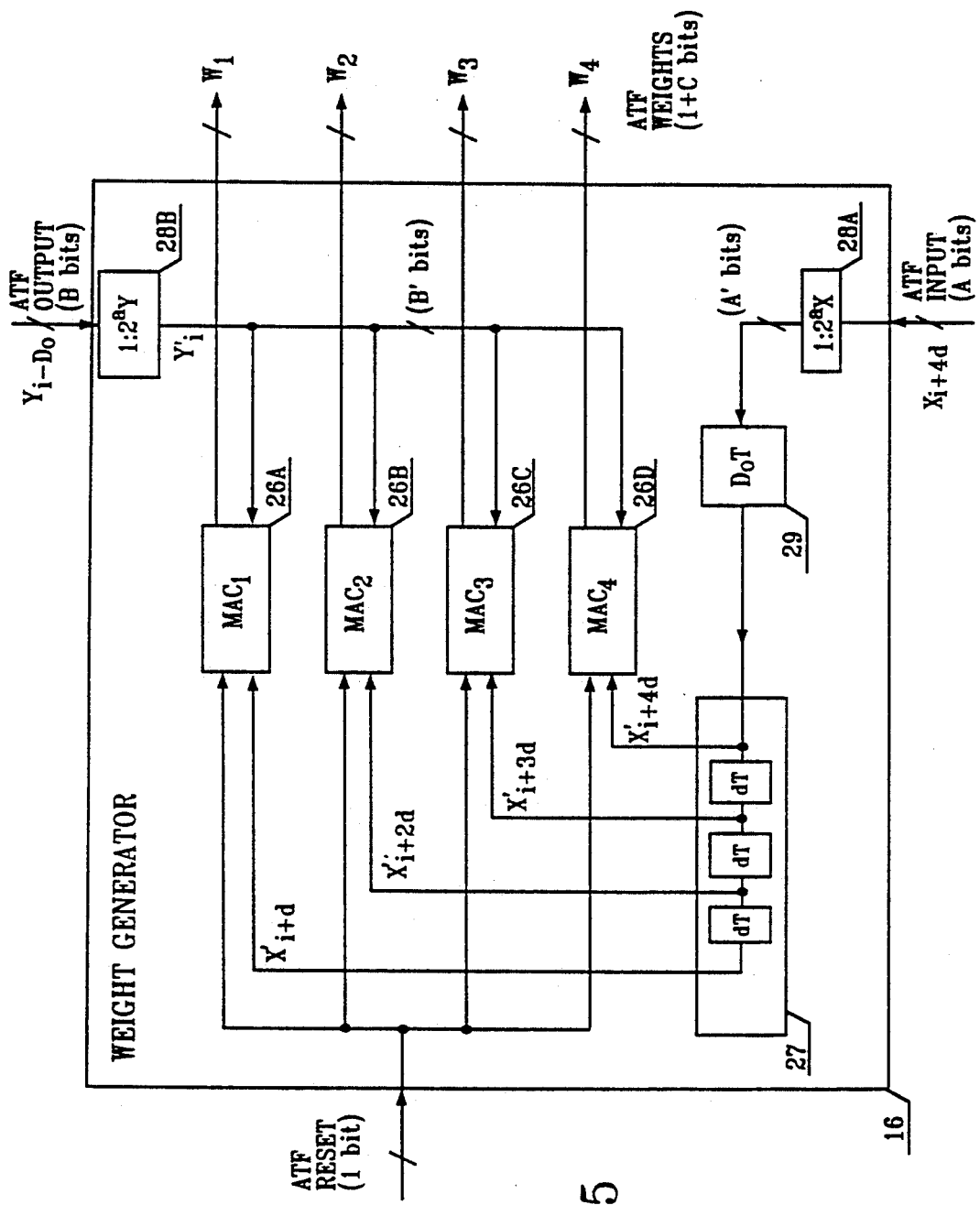
FIG. 5 is a block diagram of a digital weight generator section of the preferred embodiment of the invention shown in FIG. 1.

The implementation of the digital weight generator 16, is shown in FIG. 5. The weight generator consists of four multiply/accumulate (MAC) sections 26A–26D. Each one of the $MAC_k$ sections, where k=1,2,3,4, has three inputs: (1) a scaled and time-aligned input signal denoted as $X_{i'+kd}$, (2) a scaled feedback signal denoted as $Y_i'$, and (3) a control signal denoted as RESET. The output of $MAC_k$ is the ATF weight $W_k$, which multiplies the signals $X_{i-kd}$ and $X_{i+kd}$ as described in the FIR filter implementation.

The input signals $X_{i'+kd}$ are obtained at the k-tap of the TDL 27, which is driven by a delayed and scaled version $X'$ of the ATF input X. The purpose of the scaling $2^a$ introduced by the divider 28A is to implement part of the step-size u of the Widrow-Hoff adaptive algorithm. In a discrete-component implementation, division by $2^a$ is accomplished by routing the j-bit of X to the (j+a)−bit of $X'$; in a DSP implementation we may rotate X to the right by "a" bits. It should be noted that the above operation does not necessarily introduce loss of resolution. For example, if we have an 8-bit ADC and 12-bit MAC input, attenuation at 28A by a factor of $2^1, 2^2, 2^3, 2^4$ retains the same effective resolution in the signals $X'$ and X; attenuation by a factor of $2^5$ results in 1-bit loss of resolution, and so on. If $A'$ denotes the effective bit resolution of $X'$, the output of the divider 28A need be only $A'$-bits wide.

The purpose of the delay 29 is to align the input signal to the TDL 27 with the ATF output signal Y. The introduced delay of $D_o$ (sampling) cycles is equal to the processing delay of the FIR filter. For example, in a prototype implementation of the system shown, the multiply/add section 21 (FIG. 4) had processing delay of $D_1=7$ cycles and the adder 25 (FIG. 4) had a processing delay of 2 cycles, so that $D_o=7+2=9$ cycles.

The feedback signal $Y'$ is the output of the divider 28B, which attenuates the ATF output $Y'$ by the factor $2^b$. The effective bit-resolution of $Y'$, denoted as $B'$, depends of the bit-resolution of Y, the resolution of the MAC input, and the attenuation, in the same fashion as described above in the operation of the divider 28A. The effective step-size u of the Widrow-Hoff algorithm, as implemented by the dividers 28A and 28B is $u=\frac{1}{2}^c$, c=a+b. For a given step-size (in a specific implementation, for example, $u=\frac{1}{2}^7$), the apportionment of the step-size exponent c between the input and feedback signals $(X', Y')$ is an important design issue if it affects the corresponding bit-resolutions $(A', B')$. This is the case in high sampling rate and/or low-cost applications in which there is limited resolution at the MAC input. For example, in a prototype implementation at a 22 MHz sampling rate, the bit-resolution parameters were A=8 bits, B=10 bits, and 8 bits for the MAC input. Accordingly, in the above case, every bit of attenuation assigned to the dividers 28A and 28B resulted in one bit of loss of resolution in $X'$ and $Y'$ respectively. Moreover, in accordance with the invention, the ATF gain is maximized if the loss of resolution in the feedback signal is minimized. A qualitative explanation of this behavior can be presented as follows: As the ATF suppresses the interference, the ATF output signal decreases and the feedback signal $Y'$ decreases. As long as $Y'$ falls within the dynamic range of $B'$ bits, the updating of the ATF weights is sensitive to ATF output variations, and the weights evolve towards additional suppression of the interference. When $Y'$ has decreased to the end of the dynamic range of $B'$ bits, the updating of the ATF weights becomes insensitive to ATF output variations, and interference suppression cannot proceed any further. For example, a prototype implementation used a=c=7, b=0, resulting in $X_n=(\frac{1}{2}^7)SIGN(X_{n-D_o})$, that is $X'$ preserved only the sign of the ATF input.

Normally $MAC_k$ updates the ATF weight $W_k$ by adding the product of the input signals to the old value of the weight, that is, $NEW(W_k)=OLD(W_k)+Y_i'X_{i'+kd}$. Typically there is no loss of resolution in the above operation and the effective bit-resolution of the ATF weight (denoted as C) depends on the resolution of the user device. For example, a prototype implementation had 16 bits of signal resolution plus 3 extension bits at the MAC output, but only C=10 bits of signal resolution plus 1 extension bit at the FIR filter side.

When the RESET control signal is on, the accumulation operation of $MAC_k$ is disabled so that the resulting weight $W_k$ is equal to the product of the input signals, that is $NEW (W_k)=Y_i'X_{i'+kd}$. Since the maximum value of the product is equal to the step-size $u=\frac{1}{2}^7$, the enabling of the RESET control signal effectively resets the ATF weights to almost zero values and thereby reconvenes the ATF adaptation process. It has been further determined that periodic resetting of the ATF weights is an effective way to combat weight drifting. It requires a small increase in system complexity and it causes a small loss in ATF gain. The above is true provided that the rate of ATF weight drifting is sufficiently slower than the rate of ATF convergence, so that the period of resetting ($T_{RES}$) can be longer than the convergence time ($T_{CON}$) by at least a factor of 10. This is necessary because the postcorrelation SNR loss due to resetting can be approximated as $(1-T_{CON}/T_{RES})^2$, resulting in a loss of about 1 dB for $T_{CON}/T_{RES}=0.10$. The instrumentation of the RESET pulse generation is simplified by observing that the intended effect does not require that the pulse duration is of the order of one sampling cycle. In a prototype implementation, for example, a RESET period of 20 msec and a RESET duration of about 700 nsec was used.

The foregoing description of the architecture of particular embodiments of a digital adaptive transversal filter according to the invention is intended as illustrative of, and not as limiting of, the scope of the invention, which in its essential form comprises a first circuit section for regulating the power of, and for digitizing, a received spread-spectrum signal contaminated by interference; a second section wherein digital processing elements perform finite-impulse-response filtering of the digitized spread-spectrum signal using variable weights;

and a third section wherein digital processing elements perform stable updating of said variable weights for automatic suppression of the interference in the received spread-spectrum signal. The invention being thus disclosed, variations and modifications of a digital adaptive transversal filter according to the invention, or sections thereof, will occur to those skilled in the art, and are intended to be within the spirit and scope of the invention, as defined by the following claims:

What is claimed is:

1. A digital adaptive transversal filter for processing a composite analog input signal comprising multiple direct-sequence spread-spectrum signals, additive thermal noise, and additive multiple narrowband interferers, and for providing a digital output signal to carrier/code removal means, said adaptive transversal filter comprising automatic gain control means for compensating for power excursions in said analog input signal, and for generating a power-regulated analog signal which is linearly related to the received signal, analog-to-digital converter means for converting said power-regulated analog signal to a multi-bit digital input signal, digital finite impulse response filter means, being responsive to said digital input signal and using a set of variable digital weight coefficients for generating a digital output signal containing said multiple spread-spectrum signals, additive noise, and a reduced amount of narrowband interference, digital weight generator means responsive to the digital input and digital output signals for updating said digital weight coefficients, and reset generator means for periodically resetting said digital weight coefficients to zero initial values.

2. An adaptive transversal filter according to claim 1, wherein the automatic gain control means further comprises means for amplifying the unregulated analog input signal by a variable gain, as the power of said signal decreases from a highest operating level $P_{IFH}$ to an intermediate level $P_{IFM}$, means for amplifying the unregulated analog input signal by a fixed gain, as the power of said signal decreases form an intermediate level $P_{IFM}$ to a lowest operating level $P_{IFL}$, and means for providing the power-regulated analog input signal to the analog-to-digital converter means.

3. An adaptive transversal filter according to claim 1, wherein the analog-to-digital converter means further comprises means for sampling said power-regulated analog input signal at a rate independent of the processing rate of the carrier/code removal means, means for digitizing said samples to A bits to generate a digital input signal, and means for providing the digital input signal to the finite impulse response filter and to the weight generator means.

4. An adaptive transversal filter according to claim 1, wherein the finite impulse response filter means further comprises means for storing 2N samples of said digital input signal to provide a reference sample delayed by N sampling intervals from the most recent sample, N first samples occurring prior to said reference sample, and N second samples occurring after said reference sample and ending with the most recent sample.

means for subtracting from said reference sample a weighted sum of said N first samples and a weighted sum of said N second samples to generate a digital output signal, means for providing symmetric weighting of said first and second samples, so that is one of the first samples and one of the second samples are delayed equally from said reference sample they are weighted equally, means for eliminating the null-zone of the digital input signal, and means for providing the digital output signal to the carrier/code removal means and to the digital weight generator means.

5. An adaptive transversal filter according to claim 1, wherein the digital weight generator means further comprises means for updating each weight coefficient by adding to the most recent value of said weight coefficient a corresponding weight-increment, which depends on the digital input and output signals of the filter, weight generator multiplier means for generating said weight-increment by multiplying an attenuated output sample by an attenuated input sample whose relative delay is equal to the relative delay between the finite impulse response filter input sample corresponding to said weight coefficient, and said reference sample of the finite impulse response filter, means for apportioning the amplitude attenuations of the input and output samples so that the total amplitude attenuation is of the order of $2^7$, and the effective resolution of the attenuated output signal exceeds the effective resolution of the attenuated input signal by a number of bits which depends on the maximum interference-to-noise ratio and on the resolution of the weight generator multiplier means, and means for providing said updated weight coefficients to the finite impulse response filter means.

6. An adaptive transversal filter according to claim 1, wherein the reset generator means further comprises means for generating periodically a reset pulse having a width of a few sampling intervals and a period selected to avoid excessive weight drifting in the presence of single-tone interference at a maximum specified input power level, and means for suppressing an accumulation of weight coefficient values in the digital weight generator means for the duration of said reset pulse, thereby effecting reinitialization of the weight coefficients.

* * * * *

UNITED STATES PATENT AND TRADEMARK OFFICE
CERTIFICATE OF CORRECTION

PATENT NO. : 5,268,927

DATED : December 7, 1993

INVENTOR(S) : Dimos et al.

It is certified that error appears in the above-identified patent and that said Letters Patent is hereby corrected as shown below:

Title Page, in Item [56] references cited, add the following

U.S. Patent document:

4,613,978 9/1986 Kurth et al.

Signed and Sealed this

Twenty-third Day of August, 1994

Attest:

BRUCE LEHMAN

*Attesting Officer*  *Commissioner of Patents and Trademarks*